United States Patent
Jung et al.

(10) Patent No.: US 10,454,086 B2
(45) Date of Patent: Oct. 22, 2019

(54) SEPARATOR FOR RECHARGEABLE LITHIUM BATTERY AND RECHARGEABLE LITHIUM BATTERY INCLUDING THE SAME

(71) Applicants: SAMSUNG SDI CO., LTD., Yongin-si, Gyeonggi-do (KR); SAMSUNG ELECTRONICS CO., LTD., Suwon-si, Gyeonggi-do (KR)

(72) Inventors: Bokyung Jung, Yongin-si (KR); Byungmin Lee, Suwon-si (KR); Seungrim Yang, Seongnam-si (KR); Myungkook Park, Suwon-si (KR); Eon-Mi Lee, Yongin-si (KR); Sungsoo Han, Hwaseong-si (KR); Hana Kim, Suwon-si (KR); Jungsue Jang, Suwon-si (KR); Minho Cho, Suwon-si (KR); Hyoungwoo Choi, Hwaseong-si (KR)

(73) Assignees: SAMSUNG SDI CO., LTD., Yongin-si, Gyeonggi-do (KR); SAMSUNG ELECTRONICS CO., LTD., Suwon-si, Gyeonggi-do (KR)

( * ) Notice: Subject to any disclaimer, the term of this patent is extended or adjusted under 35 U.S.C. 154(b) by 122 days.

(21) Appl. No.: 15/082,369

(22) Filed: Mar. 28, 2016

(65) Prior Publication Data
US 2016/0293920 A1    Oct. 6, 2016

(30) Foreign Application Priority Data
Mar. 31, 2015  (KR) .......................... 10-2015-0045454

(51) Int. Cl.
*H01M 2/16*      (2006.01)
*H01M 10/052*   (2010.01)

(52) U.S. Cl.
CPC .......... *H01M 2/1653* (2013.01); *H01M 2/166* (2013.01); *H01M 2/1686* (2013.01); *H01M 10/052* (2013.01)

(58) Field of Classification Search
None
See application file for complete search history.

(56) References Cited

U.S. PATENT DOCUMENTS

2010/0316903 A1* 12/2010 Kim .................... H01M 2/1653
                                                     429/145
2012/0263994 A1* 10/2012 Yamada ................. C08L 83/04
                                                     429/144

FOREIGN PATENT DOCUMENTS

JP      2007-234458 A     9/2007
JP      2011-006585 A     1/2011
(Continued)

OTHER PUBLICATIONS

Jung, et al., "High Performance Organic-Inorganic Hybrid Barrier Coating for Encapsulation of OLEDs", J. Mater. Chem., 2011, 21, 1977-1983.

(Continued)

*Primary Examiner* — Tracy M Dove
(74) *Attorney, Agent, or Firm* — Lee & Morse, P.C.

(57) ABSTRACT

A separator for a rechargeable lithium battery includes a substrate and a heat-resistant porous layer on at least one side of the substrate. The heat-resistant porous layer includes a crosslinked binder. The crosslinked binder has a crosslinked structure of a crosslinkable compound including a siloxane compound. The siloxane compound includes a siloxane resin including a unit represented by the chemical formula $R^1SiO_{3/2}$, where $R^1$ is a curable reactive group, or an organic group having a curable reactive group.

17 Claims, 2 Drawing Sheets

(56) References Cited

FOREIGN PATENT DOCUMENTS

| | | | |
|---|---|---|---|
| JP | 2011006585 A | * | 1/2011 |
| JP | 2012-221824 | | 11/2012 |
| JP | 2014-118444 A | | 6/2014 |
| JP | 2014-173016 A | | 9/2014 |
| KR | 10-2009-0056811 A | | 6/2009 |
| KR | 10-0948267 B1 | | 3/2010 |
| KR | 10-1002161 B1 | | 12/2010 |
| KR | 10-2013-0098553 A | | 9/2013 |
| KR | 10-2013-0135212 A | | 12/2013 |

OTHER PUBLICATIONS

Yang, "Fabrication and Applications of Photo Curable Oxetane/Cyclo-Aliphatic Epoxy Hybrid Material", Ph. D. Dissertation, KAIST 2012 (pp. 49-50).

* cited by examiner

SEPARATOR FOR RECHARGEABLE LITHIUM BATTERY AND RECHARGEABLE LITHIUM BATTERY INCLUDING THE SAME

CROSS-REFERENCE TO RELATED APPLICATION

Korean Patent Application No. 10-2015-0045454, filed on Mar. 31, 2015, in the Korean Intellectual Property Office, and entitled: "Separator for Rechargeable Lithium Battery and Rechargeable Lithium Battery Including the Same," is incorporated by reference herein in its entirety.

BACKGROUND

1. Field

Embodiments relate to a separator for a rechargeable lithium battery and a rechargeable lithium battery including the same.

2. Description of the Related Art

Recently, research on a rechargeable lithium battery has been actively made, as the desirability of a battery having high energy density as a power source for a portable electronic device has increased. In addition, electric vehicles and the like have been researched with a view to addressing environmental issues. Accordingly, research on the rechargeable lithium battery as a power source for the electric vehicle has been actively pursued.

SUMMARY

Embodiments are directed to a separator for a rechargeable lithium battery, the separator including a substrate and a heat-resistant porous layer on at least one side of the substrate. The heat-resistant porous layer includes a crosslinked binder. The crosslinked binder has a cross-linked structure of a crosslinkable compound including a siloxane compound. The siloxane compound includes a siloxane resin including a unit represented by Chemical Formula 1:

$$R^1 SiO_{3/2} \quad \text{[Chemical Formula 1]}$$

wherein, in Chemical Formula 1, $R^1$ is a curable reactive group, or an organic group having a curable reactive group.

The curable reactive group may be an alicyclic epoxy group, a (meth)acrylate group, a vinyl group, a hydroxy group, an ester group, a cyanate group, a carboxyl group, a thiol group, a C1 to C20 alkoxy group, a heterocyclic group, an amino group, a phenyl group, or a combination thereof.

In Chemical Formula 1, $R^1$ may be an alicyclic epoxy group, or a C1 to C20 alkyl group having an alicyclic epoxy group.

The siloxane resin may further include a unit represented by Chemical Formula 2, a unit represented by Chemical Formula 3, or a combination thereof:

$$(R^2)(R^3)SiO_{2/2} \quad \text{[Chemical Formula 2]}$$

$$(R^4)(R^5)(R^6)SiO_{1/2} \quad \text{[Chemical Formula 3]}$$

wherein, in Chemical Formulae 2 and 3, $R^2$, $R^3$, $R^4$, $R^5$, and $R^6$ are independently a curable reactive group, an organic group having a curable reactive group, a substituted or unsubstituted C1 to C20 alkyl group, a substituted or unsubstituted C2 to C20 alkenyl group, a substituted or unsubstituted C2 to C20 alkynyl group, or a substituted or unsubstituted C6 to C20 aryl group.

The siloxane resin may include about 50 mol % to about 99 mol % of the unit represented by Chemical Formula 1.

The siloxane resin may have a weight average molecular weight of about 600 g/mol to about 40,000 g/mol.

The siloxane compound may further include a siloxane resin including a unit represented by Chemical Formula 2, a siloxane resin including a unit represented by Chemical Formula 3, or a combination thereof:

$$(R^2)(R^3)SiO_{2/2} \quad \text{[Chemical Formula 2]}$$

$$(R^4)(R^5)(R^6)SiO_{1/2} \quad \text{[Chemical Formula 3]}$$

wherein, in Chemical Formulae 2 and 3, $R^2$, $R^3$, $R^4$, $R^5$, and $R^6$ are independently a curable reactive group, an organic group having a curable reactive group, a substituted or unsubstituted C1 to C20 alkyl group, a substituted or unsubstituted C2 to C20 alkenyl group, a substituted or unsubstituted C2 to C20 alkynyl group, or a substituted or unsubstituted C6 to C20 aryl group.

The siloxane resin that includes the unit represented by Chemical Formula 1 may be present in the siloxane compound in an amount of about 50 mol % to about 99 mol % based on the total amount of the siloxane compound.

The crosslinkable compound may further include an ether-based compound including an oxyethylene group and a crosslinkable functional group.

The crosslinkable functional group may be a (meth)acrylate group, a vinyl group, a hydroxy group, an ester group, a cyanate group, a carboxyl group, a thiol group, a C1 to C10 alkoxy group, a heterocyclic group, an amino group, or a combination thereof.

The siloxane compound may be included in the crosslinkable compound in an amount of about 50 wt % to about 99 wt % based on the total amount of the siloxane compound and the ether-based compound.

The heat-resistant porous layer may further include a filler, the filler including an inorganic particle, an organic particle, or a combination thereof.

When the filler includes the inorganic particle, the inorganic particle may include $Al_2O_3$, $SiO_2$, $B_2O_3$, $Ga_2O_3$, $TiO_2$, $SnO_2$, or a combination thereof. When the filler includes the organic particle, the organic particle includes an acryl-based compound, an imide-based compound, an amide-based compound, or a combination thereof.

The filler may be included in the heat resistant porous layer in an amount of about 50 wt % to about 95 wt % based on the total amount of the crosslinked binder and the filler.

The heat-resistant porous layer may further include a non-crosslinked binder.

The non-crosslinked binder may include a vinylidene fluoride-based polymer, polymethylmethacrylate, polyacrylonitrile, polyvinylpyrrolidone, polyvinylacetate, a polyethylene-vinylacetate copolymer, polyethyleneoxide, cellulose acetate, cellulose acetate butyrate, cellulose acetate propionate, cyanoethyl pullulan, cyanoethylpolyvinyl alcohol, cyanoethyl cellulose, cyanoethylsucrose, pullulan, carboxymethyl cellulose, an acrylonitrile-styrene-butadiene copolymer, or a combination thereof.

The filler may be included in the heat-resistant porous layer in an amount of about 50 wt % to about 99 wt % based on the total amount of the crosslinked binder, the filler, and the non-crosslinked binder.

A shrinkage ratio in a machine direction (MD) of the separator and a shrinkage ratio in a transverse direction (TD) of the separator may each be less than or equal to about 5% according to Equation 1:

$$\text{Shrinkage ratio (\%)} = [(L0-L1)/L0] \times 100 \quad \text{[Equation 1]}$$

wherein, in Equation 1, L0 indicates an initial length of a separator and L1 indicates a length of a separator after being allowed to stand at 200° C. and for 10 minutes.

Embodiments are also directed to a rechargeable lithium battery including the separator.

The rechargeable lithium battery may be operable at a voltage of about 4.35V to about 4.55V.

BRIEF DESCRIPTION OF THE DRAWINGS

Features will become apparent to those of skill in the art by describing in detail exemplary embodiments with reference to the attached drawings in which.

DETAILED DESCRIPTION

Figure 1:
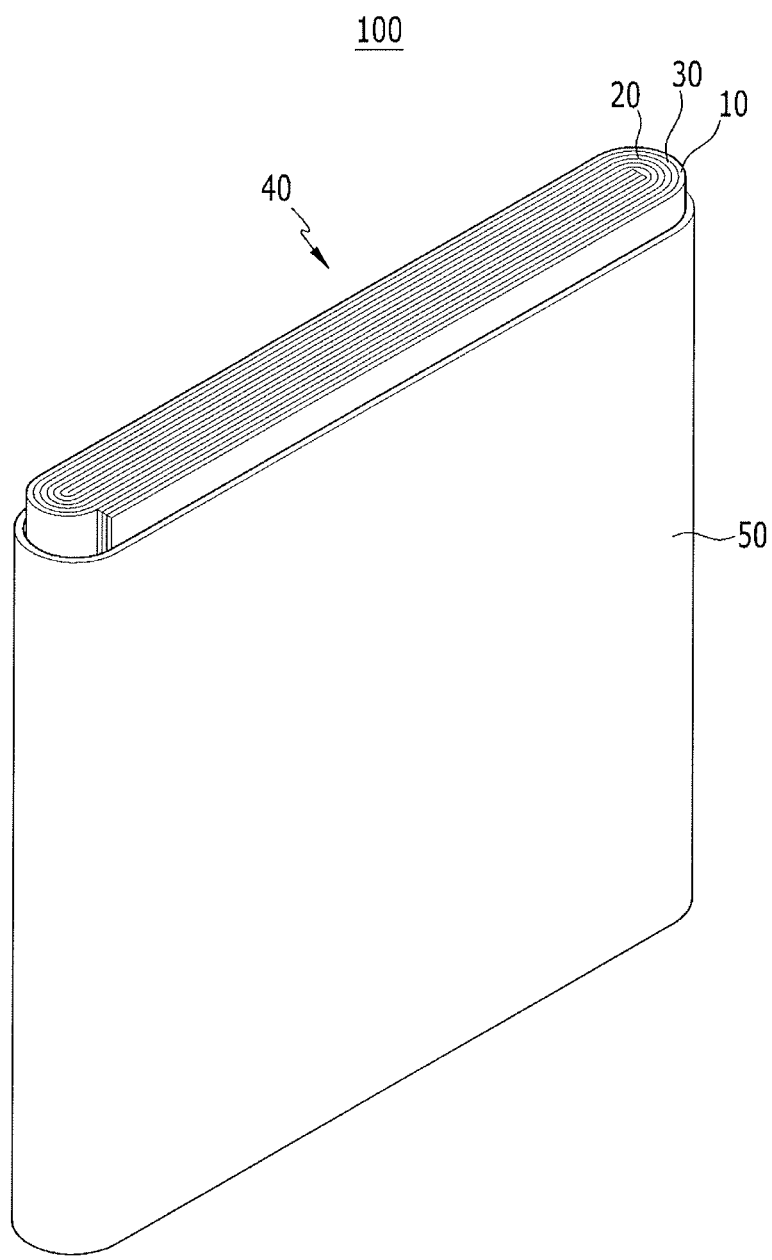
FIG. 1 illustrates an exploded perspective view of a rechargeable lithium battery according to one embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art. In the drawing figures, the dimensions of layers and regions may be exaggerated for clarity of illustration.

As used herein, when a definition is not otherwise provided, the term "substituted" refers to one substituted with a substituent selected from a halogen (F, Br, Cl, or I), a hydroxy group, an alkoxy group, a nitro group, a cyano group, an amino group, an azido group, an amidino group, a hydrazino group, a hydrazono group, a carbonyl group, a carbamyl group, a thiol group, an ester group, a carboxyl group or a salt thereof, a sulfonic acid group or a salt thereof, a phosphoric acid group or a salt thereof, a C1 to C20 alkyl group, a C2 to C20 alkenyl group, a C2 to C20 alkynyl group, a C6 to C30 aryl group, a C7 to C30 arylalkyl group, a C1 to C20 alkoxy group, a C1 to C20 heteroalkyl group, a C3 to C20 heteroarylalkyl group, C3 to C20 cycloalkyl group, C3 to C20 cycloalkenyl group, a C4 to C20 cycloalkynyl group, a C2 to C20 heterocycloalkyl group, and a combination thereof, instead of hydrogen of a compound.

As used herein, when a definition is not otherwise provided, the term 'hetero' refers to one including 1 to 3 hetero atoms selected from N, O, S, and P.

Hereinafter, a separator for a rechargeable lithium battery according to one embodiment is described.

The separator for a rechargeable lithium battery according to an embodiment separates a negative electrode and a positive electrode from each other and provides a transporting passage for lithium ions. The separator may include a substrate and a heat-resistant porous layer disposed on at least one side of the substrate.

The substrate may be porous. For example, the substrate may include pores. Lithium ions may be transferred through the pores.

The substrate may be made of, for example, polyolefin, polyester, polytetrafluoroethylene, polyacetal, polyamide, polyimide, polycarbonate, polyetheretherketone, polyaryletherketone, polyetherimide, polyamideimide, polybenzimidazole, polyethersulfone, polyphenyleneoxide, a cyclic olefin copolymer, polyphenylene sulfide, polyethylenenaphthalene, a glass fiber, or a combination thereof.

Examples of the polyolefin include polyethylene, polypropylene, or the like, and examples of the polyester include polyethyleneterephthalate, polybutyleneterephthalate, or the like.

The substrate may be a non-woven fabric or a woven fabric.

The substrate may have a single layer structure or a multilayer structure. For example, the substrate may be a polyethylene single layer, a polypropylene single layer, a polyethylene/polypropylene double layer, a polypropylene/polyethylene/polypropylene triple layer, a polyethylene/polypropylene/polyethylene triple layer, or the like.

A thickness of the substrate may be about 1 μm to about 40 μm, or, for example, about 1 μm to about 30 μm, about 1 μM to about 20 μm, about 5 μm to about 20 μm, or about 5 μm to about 10 μm. When the thickness of the substrate is within the range, a short-circuit between positive and negative electrodes may be prevented without increasing internal resistance of a battery.

The heat-resistant porous layer may be formed on one side or on both sides of the substrate. The heat-resistant porous layer may include a crosslinked binder.

The crosslinked binder may have a cross-linked structure formed by curing a crosslinkable compound having a curable reactive group. The crosslinkable compound having the curable reactive group may be a monomer, an oligomer, a polymer, or mixture thereof having a curable reactive group.

The crosslinkable compound may be a siloxane compound having a curable reactive group. For example, the siloxane compound may be a siloxane resin. The siloxane resin may be an oligomer or a polymer. The siloxane resin may include a T (tri)-shaped unit represented by Chemical Formula 1.

 [Chemical Formula 1]

In Chemical Formula 1, $R^1$ is a curable reactive group, or an organic group having a curable reactive group.

When the crosslinked binder obtained by curing a siloxane resin having a curable reactive group and having the structure having a T-shaped siloxane unit represented by Chemical Formula 1 is used to form a heat-resistant porous layer, the separator may have remarkably improved heat resistance, excellent oxidation resistance that is operable at a high voltage, and improved electrolyte solution wettability. Accordingly, a rechargeable lithium battery having improved cell performance such as cycle-life characteristics as well as improved thermal stability during battery explosion and overheating may be realized.

The curable reactive group is a reactive group that can react by heat or light. The curable reactive group may be, for example, an alicyclic epoxy group, a (meth)acrylate group, a vinyl group, a hydroxy group, an ester group, a cyanate group, a carboxyl group, a thiol group, a C1 to C20 alkoxy group, a heterocyclic group, an amino group, a phenyl group, or a combination thereof. For example, an alicyclic epoxy group may be used.

The alicyclic epoxy group may be a C6 to C20 cycloalkyl group including a fused epoxy structure, a C6 to C20 cycloalkenyl group including a fused epoxy structure, or a C3 to C20 cycloalkynyl group including a fused epoxy structure. For example, alicyclic epoxy group may be a C6 to C20 cycloalkyl group including a fused epoxy structure. For example, a C6 cycloalkyl group including a fused epoxy structure may be represented by the following structure:

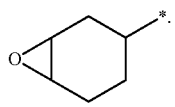

The ester group of the reactive group may be represented by —COOR, and the amino group may be represented by —NR$^a$R$^b$, wherein R, R$^a$ and R$^b$ are a C1 to C20 alkyl group, a C2 to C20 alkenyl group, a C2 to C20 alkynyl group, a C3 to C20 cycloalkyl group, a C3 to C20 cycloalkenyl group, a C4 to C20 cycloalkynyl group, or a C6 to C30 aryl group. The heterocyclic group may be a C2 to C20 heterocycloalkyl group, a C3 to C20 heterocycloalkenyl group, a C3 to C20 heterocycloalkynyl group, or a C6 to C20 heteroaryl group. For example, the heterocyclic group may be an epoxy group, an oxetane group, or the like.

The organic group having a curable reactive group may be a C1 to C20 alkyl group, a C2 to C20 alkenyl group, a C2 to C20 alkynyl group, a C3 to C20 cycloalkyl group, a C3 to C20 cycloalkenyl group, a C3 to C20 cycloalkynyl group, or a C6 to C30 aryl group. These may be substituted with at least one of the curable reactive group.

For example, in Chemical Formula 1, R$^1$ may be an alicyclic epoxy group, or a C1 to C20 alkyl group having an alicyclic epoxy group. The alicyclic epoxy group may be a C6 to C20 cycloalkyl group including a fused epoxy structure.

A siloxane compound according to an embodiment may be a siloxane resin made up entirely of the T-shaped unit represented by Chemical Formula 1, or may be a siloxane resin including the T-shaped unit represented by Chemical Formula 1 and other units. For example, the siloxane resin may further include a D-shaped unit represented by Chemical Formula 2, an M-shaped unit represented by Chemical Formula 3, or a combination thereof, in addition to the T-shaped unit represented by Chemical Formula 1.

(R$^2$)(R$^3$)SiO$_{2/2}$     [Chemical Formula 2]

(R$^4$)(R$^5$)(R$^6$)SiO$_{1/2}$     [Chemical Formula 3]

In Chemical Formulae 2 and 3, R$^2$, R$^3$, R$^4$, R$^5$, and R$^6$ may be independently a curable reactive group, an organic group having a curable reactive group, a substituted or unsubstituted C1 to C20 alkyl group, a substituted or unsubstituted C2 to C20 alkenyl group, a substituted or unsubstituted C2 to C20 alkynyl group, or a substituted or unsubstituted C6 to C20 aryl group. The curable reactive group and the organic group having a curable reactive group may be the same as the substituent of R$^1$ in Chemical Formula 1.

When the T-shaped unit represented by Chemical Formula 1 and at least one of the D-shaped unit and the M-shaped unit represented by Chemical Formulae 2 and 3 are included in the siloxane resin, the siloxane resin may include the T-shaped unit represented by Chemical Formula 1 in an amount of greater than or equal to about 50 mol %, or, for example, about 50 mol % to about 99 mol %, about 70 mol % to about 99 mol %, or about 80 mol % to about 99 mol % of the siloxane resin. A crosslinked binder obtained by curing the siloxane resin including the T-shaped unit represented by Chemical Formula 1 within the range may provide a separator having improved heat resistance and oxidation resistance.

The siloxane resin including the T-shaped unit represented by Chemical Formula 1 may have a weight average molecular weight of about 600 g/mol to about 40,000 g/mol, or, for example, about 1,000 g/mol to about 30,000 g/mol. When a crosslinked binder is obtained by using a siloxane resin having a weight average molecular weight within the range, a separator using the crosslinked binder may have improved heat resistance and oxidation resistance.

The siloxane resin including the T-shaped unit represented by Chemical Formula 1 may be prepared by a hydrolysis and condensation reaction of an alkoxy silane having a curable reactive group. The alkoxy silane may be represented by Chemical Formula 4. The alkoxy silane represented by Chemical Formula 4 may be used by itself or as a mixture with other alkoxy silanes.

R$^1$Si(OR$^d$)$_3$     [Chemical Formula 4]

In Chemical Formula 4,
R$^1$ is a curable reactive group, or an organic group having a curable reactive group, and
R$^d$ is a substituted or unsubstituted C1 to C20 alkyl group, a substituted or unsubstituted C2 to C20 alkenyl group, a substituted or unsubstituted C2 to C20 alkynyl group, a substituted or unsubstituted C3 to C20 cycloalkyl group, a substituted or unsubstituted C3 to C20 cycloalkenyl group, a substituted or unsubstituted C3 to C20 cycloalkynyl group, or a substituted or unsubstituted C6 to C30 aryl group.

When the alkoxy silane represented by Chemical Formula 4 is used with another alkoxy silane, the other alkoxy silane may be at least one of compounds represented by Chemical Formulae 5 and 6.

(R$^2$)(R$^3$)Si(OR$^d$)$_2$     [Chemical Formula 5]

(R$^4$)(R$^5$)(R$^6$)Si(OR$^d$)     [Chemical Formula 6]

In Chemical Formulae 5 and 6, R$^2$, R$^3$, R$^4$, R$^5$, and R$^6$ are independently a curable reactive group, an organic group having a curable reactive group, a substituted or unsubstituted C1 to C20 alkyl group, a substituted or unsubstituted C2 to C20 alkenyl group, a substituted or unsubstituted C2 to C20 alkynyl group, or a substituted or unsubstituted C6 to C20 aryl group, and R$^d$ may be a substituted or unsubstituted C1 to C20 alkyl group, a substituted or unsubstituted C2 to C20 alkenyl group, a substituted or unsubstituted C2 to C20 alkynyl group, a substituted or unsubstituted C3 to C20 cycloalkyl group, a substituted or unsubstituted C3 to C20 cycloalkenyl group, a substituted or unsubstituted C3 to C20 cycloalkynyl group, or a substituted or unsubstituted C6 to C30 aryl group.

For example, an alkoxy group of the alkoxy silane may be hydrolyzed by water to form a hydroxyl group, and the hydroxyl group may form a siloxane bond by a condensation reaction between the hydroxyl groups or the alkoxy groups.

In addition, the siloxane resin including the T-shaped unit represented by Chemical Formula 1 may be prepared through a non-hydrolytic sol-gel reaction as well as by the hydrolysis and condensation reaction.

A siloxane compound according to one embodiment may include the siloxane resin including the T-shaped unit represented by Chemical Formula 1 by itself, or may include a mixture of the siloxane resin including the T-shaped unit represented by Chemical Formula 1 and a siloxane resin including other units. For example, the siloxane compound may further include a siloxane resin including a D-shaped unit represented by Chemical Formula 2, a siloxane resin including an M-shaped unit represented by Chemical Formula 3, or a combination thereof, as well as the siloxane resin including the T-shaped unit represented by Chemical Formula 1.

The siloxane resin including the D-shaped unit represented by Chemical Formula 2 may have a weight average molecular weight of about 100 g/mol to about 2,000 g/mol, or, for example, about 400 g/mol to about 1,000 g/mol. The siloxane resin including the M-shaped unit represented by Chemical Formula 3 may have a weight average molecular weight of about 100 g/mol to about 2,000 g/mol, or, for example, about 400 g/mol to about 1,000 g/mol.

When the siloxane resin including the T-shaped unit represented by Chemical Formula 1 is mixed with the siloxane resin including other units, the siloxane resin including the T-shaped unit represented by Chemical Formula 1 may be included in an amount of about 50 wt % to about 99 wt %, or for example, about 70 wt % to about 99 wt % based on the total amount of the siloxane compound. When the siloxane resin including the T-shaped unit represented by Chemical Formula 1 is used within the content range to form a crosslinked binder, a separator using the crosslinked binder may have improved heat resistance and oxidation resistance.

The crosslinkable compound according to one embodiment may include the siloxane compound by itself or in a mixture with another crosslinkable compound. The other crosslinkable compound may be a non-siloxane-based compound having a crosslinkable reactive group. For example, an ether-based compound may be further included in addition to the siloxane compound. The ether-based compound may be a compound including an oxyethylene group and a crosslinkable functional group in its molecule structure.

The crosslinkable functional group may be a (meth) acrylate group, a vinyl group, a hydroxy group, an ester group, a cyanate group, a carboxyl group, a thiol group, a C1 to C10 alkoxy group, a heterocyclic group, an amino group, or a combination thereof. The ester group may be represented by —COOR, and the amino group may be represented by —NR$^a$R$^b$, wherein R, R$^a$ and R$^b$ are a C1 to C20 alkyl group, a C2 to C20 alkenyl group, a C2 to C20 alkynyl group, a C3 to C20 cycloalkyl group, a C3 to C20 cycloalkenyl group, a C4 to C20 cycloalkynyl group, or a C6 to C30 aryl group. The heterocyclic group may be a C2 to C20 heterocycloalkyl group, a C3 to C20 heterocycloalkenyl group, a C3 to C20 heterocycloalkynyl group, or a C6 to C20 heteroaryl group, for example, an epoxy group, an oxetane group, or the like. For example, the cross-linkable functional group may be an epoxy group.

The siloxane compound may be included in an amount of about 50 wt % to about 99 wt %, or, for example, about 70 wt % to about 99 wt % based on the total amount of the siloxane compound and the ether-based compound. When the siloxane compound is mixed as a crosslinkable compound within the content range to form a crosslinked binder, a separator using the crosslinked binder may have improved heat resistance and oxidation resistance.

The crosslinked binder may be used as a binder of the heat-resistant porous layer.

The heat-resistant porous layer may have a thickness of about 0.01 μm to about 20 μm, or, for example, about 1 μm to about 10 μm, or about 1 μm to about 5 μm. When the thickness of the heat-resistant porous layer is within the ranges, a short-circuit inside a battery may be suppressed, a safe separator may be ensured due to improved heat resistance, and an increase of the internal resistance of a battery may be suppressed.

Hereinafter, a separator for a rechargeable lithium battery according to another embodiment is described.

A separator for a rechargeable lithium battery according to this embodiment may include a substrate and a heat-resistant porous layer disposed on at least one side of the substrate. The heat-resistant porous layer may include a binder and a filler. The binder may be the crosslinked binder according to the previous embodiment. The separator according to this embodiment includes the filler, unlike the separator according to the previous embodiment. The other constituent elements may be substantially the same. Accordingly, the filler will be mainly described herein.

When the filler is added to the heat-resistant porous layer, cell performance may be improved by further preventing thermal shrinkage of a substrate and thus suppressing short-circuits between positive and negative electrodes and in addition, minimizing resistance of lithium ions. The filler may be used along with the crosslinked binder, and thus, may maximize a thermal shrinkage-preventing effect and improved electrolyte solution wettability due to high crosslinking.

The filler may include an inorganic particle, an organic particle, or a combination thereof.

The inorganic particle may include $Al_2O_3$, $SiO_2$, $B_2O_3$, $Ga_2O_3$, $TiO_2$, $SnO_2$, or a combination thereof, as examples.

The organic particle may be a particle including an acryl-based compound, an imide-based compound, an amide-based compound, or a combination thereof, as examples.

The filler may have an average particle diameter of about 1 nm to about 2,000 nm, or, for example, about 100 nm to about 1,000 nm, or about 100 nm to about 500 nm. The filler may include at least two kinds of filler having different particle diameters. When the filler has an average particle diameter within the range, performance of a rechargeable lithium battery may be secured by uniformly forming a heat-resistant porous layer on a substrate and suppressing a short-circuit between positive and negative electrodes, and in addition, minimizing resistance of lithium ions.

An amount of the filler may be about 50 wt % to about 95 wt %%, for example, about 50 wt % to about 80 wt % based on the total amount of the heat-resistant porous layer, specifically, the crosslinked binder and the filler. When the filler is included within the amount range, cycle-life characteristics may be improved by preventing the shrinkage of a substrate by heat, suppressing a short-circuit between positive and negative electrodes, and improving electrolyte solution wettability.

Hereinafter, a separator for a rechargeable lithium battery according to another embodiment is described.

A separator for a rechargeable lithium battery according to this embodiment may include a substrate and a heat-resistant porous layer disposed on at least one side of the substrate, wherein the heat-resistant porous layer may include a binder and a filler. Herein, the binder may include a crosslinked binder and a non-crosslinked binder. The separator according to the present embodiment includes the non-crosslinked binder, unlike the separator according to the previous embodiment. Other constituent elements may be substantially the same. Accordingly, the non-crosslinked binder will be mainly illustrated herein.

The non-crosslinked binder may be different from the crosslinked binder. The non-crosslinked binder may be a compound without a curable functional group.

For example, the non-crosslinked binder may be a vinylidene fluoride-based polymer, polymethylmethacrylate, polyacrylonitrile, polyvinylpyrrolidone, polyvinylacetate, a polyethylene-vinylacetate copolymer, polyethyleneoxide, cellulose acetate, cellulose acetate butyrate, cellulose acetate propionate, cyanoethyl pullulan, cyanoethylpolyvinyl alcohol, cyanoethyl cellulose, cyanoethylsucrose, pullulan, carboxymethyl cellulose, an acrylonitrile-styrene-butadiene copolymer, or a combination thereof.

When the non-crosslinked binder is used with the crosslinked binder, adherence to the substrate may be increased and a uniform heat-resistant porous layer may be formed. Thus, a safer separator may be ensured. In addition, electrolyte solution impregnation properties may be improved, and thus cycle-life characteristics and high rate charge and discharge characteristics of a battery may be improved.

The vinylidene fluoride-based polymer may be a homopolymer including only a vinylidene fluoride monomer-derived unit, or may be a copolymer including a vinylidene fluoride-derived unit and other monomer-derived units. The copolymer may include, for example, a vinylidene fluoride-derived unit and at least one unit derived from chlorotrifluoroethylene (CTFE), trifluoroethylene (TFE), hexafluoropropylene (HFP), ethylene tetrafluoride, or an ethylene monomer, as examples. The copolymer may be a polyvinylidene fluoride-hexafluoropropylene (PVdF-HFP) copolymer including a vinylidene fluoride monomer-derived unit and a hexafluoropropylene (HFP) monomer-derived unit.

The non-crosslinked binder may include, for example, a polyvinylidene fluoride (PVdF) homopolymer, a polyvinylidene fluoride-hexafluoropropylene (PVdF-HFP) copolymer, or a combination thereof.

The vinylidene fluoride-based polymer may have a weight average molecular weight of about 300,000 g/mol to about 1,500,000 g/mol, or, for example, about 400,000 g/mol to about 1,200,000 g/mol. When the weight average molecular weight of the vinylidene fluoride-based polymer is within the ranges, adherence of the substrate and the heat-resistant porous layer may be fortified and adherence to an electrode may be also improved. In addition, the vinylidenefluoride-based polymer may also be easily dissolvable in a small amount of a solvent during formation of a heat-resistant porous layer. The vinylidenefluoride-based polymer may facilitate drying of the heat-resistant porous layer as well as suppress a thermal shrinkage of a substrate and help to prevent a short-circuit between positive and negative electrodes. In addition, very excellent impregnation properties in an electrolyte solution may be obtained, and thus, cycle-life characteristics and high rate charge and discharge characteristics of a rechargeable lithium battery may be improved.

The polyvinylidene fluoride-hexafluoropropylene (PVdF-HFP) copolymer may include about 0.1 wt % to about 40 wt %, or, for example, about 1 wt % to about 20 wt % of a repeating unit derived from hexafluoropropylene based on the total amount of a repeating unit derived from vinylidene fluoride and a repeating unit derived from hexafluoropropylene, as examples.

In the heat-resistant porous layer, the crosslinked binder and the non-crosslinked binder may be included in a weight ratio of about 3:7 to about 8:2, or, for example, about 3:7 to about 7:3, or about 4:6 to about 6:4. When the crosslinked binder and the non-crosslinked binder are mixed in the weight ratio ranges, adherence to a substrate may be fortified and heat resistance, mechanical strength and electrolyte solution wettability of the separator may be maximized.

The filler may be included in an amount of about 50 wt % to about 99 wt %, or, for example, about 60 wt % to about 95 wt % based on the total amount of a binder including the crosslinked binder and the non-crosslinked binder and the filler. When the filler is included within the amount range, cell performance may be improved by preventing the shrinkage of a substrate, suppressing a short-circuit between positive and negative electrodes, and improving electrolyte solution wettability.

A separator for a rechargeable lithium battery according to the present embodiment may include a substrate and a heat-resistant porous layer disposed on at least one side of the substrate, wherein the heat-resistant porous layer includes at least two binders. The binder may include the crosslinked binder and the non-crosslinked binder. The separator according to the present embodiment may include the non-crosslinked binder, unlike the separator for a rechargeable lithium battery according to a previous embodiment. The crosslinked binder and non-crosslinked binder may be the same as described above.

The shrinkage ratio in each of a machine direction (MD) and a transverse direction (TD) may be less than or equal to about 5%, or for example less than or equal to about 4%, or about 3% to about 4% according to Equation 1. Herein, the transverse direction TD is a direction that is perpendicular to the machine direction. The term "shrinkage ratio refers to a length change of a separator after thermal shrinkage in each of the machine direction and the transverse direction. Accordingly, a stable rechargeable lithium battery during battery explosion and overheating may be realized.

$$\text{Shrinkage ratio (\%)} = [(L0-L1)/L0] \times 100 \quad \text{[Equation 1]}$$

In Equation 1, L0 indicates an initial length of a separator and L1 indicates a length of a separator after being allowed to stand at 200° C. and for 10 minutes.

Hereinafter, a method of manufacturing a separator for a rechargeable lithium battery according to an embodiment is described.

A method of manufacturing a separator for a rechargeable lithium battery according to an embodiment may include coating a composition including a crosslinked binder and a solvent onto at least one side of a substrate to form a heat-resistance porous layer. In an implementation, the method of manufacturing the separator for a rechargeable lithium battery may include coating a composition including a crosslinkable compound having a curable functional group for forming a crosslinked binder and a solvent onto at least one side of a substrate, and curing the same to form the heat-resistant porous layer.

A composition for the heat-resistant porous layer including the crosslinked binder or the crosslinkable compound, an initiator and the solvent may be coated onto at least one side of the substrate. For example, the composition for the heat-resistant porous layer may be prepared by mixing the crosslinked binder or the crosslinkable compound, the initiator and the solvent and stirring the same at about 10° C. to about 40° C. for about 30 minutes to about 5 hours. About 1 wt % to about 30 wt % of the crosslinked binder or the crosslinkable compound and a balance amount of the solvent may be mixed, and the initiator may be added thereto in an amount of about 1 to about 10 parts by weight, or, for example, about 1 to about 5 parts by weight based on 100 parts by weight of the crosslinked binder or the crosslinkable compound.

Specific examples of the crosslinked binder and the crosslinkable compound having a curable functional group for forming the crosslinked binder may be the same as described above.

The crosslinked binder and the non-crosslinked binder may be present in a weight ratio of about 3:7 to about 8:2, or, for example, about 3:7 to about 7:3, or about 4:6 to about 6:4 in the composition for the heat-resistant porous layer.

The crosslinkable compound and the non-crosslinked binder may be present in a weight ratio of about 3:7 to about 8:2, or, for example, about 3:7 to about 7:3, or about 4:6 to about 6:4 in the composition for the heat-resistant porous layer. As a result, the crosslinked binder and the non-crosslinked binder may be present in a weight ratio of about 3:7 to about 8:2, or, for example, about 3:7 to about 7:3, or about 4:6 to about 6:4 in the heat-resistant porous layer.

The solvent may be an alcohol such as methanol, ethanol, and isopropylalcohol or a ketone such as acetone, as examples.

The initiator may be a photoinitiator, a thermal initiator, or a combination thereof.

The photoinitiator may be used for photo-polymerization using ultraviolet rays. Examples of the photoinitiator may be an acetophenone such as diethoxyacetophenone, 2-hydroxy-2-methyl-1-phenylpropan-1-one, benzyldimethylketal, 1-hydroxycyclohexyl-phenylketone, or 2-methyl-2-morphine(4-thiomethylphenyl)propan-1-one; a benzoinethers such as benzoinmethylether, benzoinethylether, benzoinisopropylether, or benzoinisobutylether; a benzophenone such as benzophenone, o-benzoyl methyl benzoate, 4-phenylbenzophenone, 4-benzoyl-4'-methyldiphenylsulfurous acid, 4-benzoyl-N,N-dimethyl-N-[2-(1-oxo-2-propenyloxy) ethyl] benzenemetanamium bromide, or (4-benzoylbenzyl) trimethylammoniumchloride; a thioxanthone such as 2,4-diethylthioxanthone, or 1-chloro-4-dichlorothioxanthone; 2,4,6-trimethylbenzoyldiphenylbenzoyloxide; a sulfonium salt, or the like. These may be used singularly or as a mixture of two or more.

The thermal initiator may be used for a thermal polymerization. The thermal initiator may include an organic peroxide free radical initiator such as a diacylperoxide, a peroxyketal, a ketone peroxide, a hydroperoxide, a dialkylperoxide, a peroxyester, a peroxydicarbonate, lauroyl peroxide, benzoyl peroxide, cyclohexanone peroxide, 1,1-bis(t-butylperoxy)-3,3,5-trimethylcyclohexane, or t-butylhydroperoxide. These may be used singularly or as a mixture of two or more.

The composition for the heat-resistant porous layer may include at least one of a filler and a non-crosslinked binder. The filler and the non-crosslinked binder may each be as described above.

The stirring may be performed with a ball mill, a beads mill, a screw mixer, or the like.

The composition for the heat-resistant porous layer may be coated by a method of dip coating, die coating, roll coating, comma coating, or the like, as examples.

After the composition for the heat-resistant porous layer is coated onto at least one side of the substrate, a drying process may be further performed. The drying process may be performed at about 80° C. to about 100° C. for about 5 seconds to about 60 seconds in a batch or continuous method.

When the crosslinkable compound is added to the composition for a heat-resistant porous layer, the heat-resistant porous layer may be formed by curing the coated composition for a heat-resistant porous layer.

The curing may be performed through photocuring, thermal curing, or a combination thereof. The photocuring may be performed, for example, by radiating UV of about 150 nm to about 170 nm for about 5 seconds to about 60 seconds. The thermal curing may be performed, for example, at about 60° C. to about 120° C. for about 1 hour to about 36 hours, or, for example, at about 80° C. to about 100° C. for about 10 hours to about 24 hours.

The heat-resistant porous layer may be formed on a substrate by a method of lamination, coextrusion, or the like, instead of or in addition to coating of a coating composition.

Hereinafter, a rechargeable lithium battery including the separator is illustrated referring to FIG. 1.

FIG. 1 illustrates an exploded perspective view of a rechargeable lithium battery according to one embodiment. A prismatic rechargeable lithium battery according to one embodiment is for example illustrated, but it is to be understood that the present disclosure may be applied to various batteries such as a lithium polymer battery and a cylindrical battery.

Referring to FIG. 1, a rechargeable lithium battery 100 according to one embodiment may include an electrode assembly 40 including a interposed between a positive electrode 10 and a negative electrode 20, and a case 50 housing the electrode assembly 40. The positive electrode 10, the negative electrode 20 and the separator 30 may be impregnated in an electrolyte solution. It is to be understood that the rechargeable lithium battery 100 may include a cap or other structure sealing the rechargeable lithium battery 100 and electrode tabs extending from the positive electrode 10 and the negative electrode 20, respectively, such that power generated by the rechargeable lithium battery 100 is accessible outside of the rechargeable lithium battery 100.

The separator 30 is the same as described above.

The positive electrode 10 may include a positive current collector and a positive active material layer formed on the positive current collector. The positive active material layer may include a positive active material, a binder, and optionally, a conductive material.

The positive current collector may include aluminum (Al), nickel (Ni), or the like, as examples.

The positive active material may include a compound being capable of intercalating and deintercalating lithium. For example, at least one of a composite oxide or a composite phosphate of a metal selected from cobalt, manganese, nickel, aluminum, iron, or a combination thereof and lithium may be used. For example, the positive active material may include lithium cobalt oxide, lithium nickel oxide, lithium manganese oxide, lithium nickel cobalt manganese oxide, lithium nickel cobalt aluminum oxide, lithium iron phosphate, or a combination thereof.

The binder may improve binding properties of positive active material particles with one another and with a current collector. Examples include polyvinyl alcohol, carboxymethyl cellulose, hydroxypropyl cellulose, diacetyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, or the like. These binder materials may be used singularly or as a mixture of two or more.

The conductive material improves conductivity of an electrode. Examples thereof may include natural graphite, artificial graphite, carbon black, a carbon fiber, a metal powder, a metal fiber, or the like. These conductive materials may be used singularly or as a mixture of two or more. The metal of the metal powder and the metal fiber may be copper, nickel, aluminum, silver, or the like.

The negative electrode 20 may include a negative current collector and a negative active material layer formed on the negative current collector.

The negative current collector may include copper (Cu), gold (Au), nickel (Ni), a copper alloy, or the like, as examples.

The negative active material layer may include a negative active material, a binder, and optionally, a conductive material.

The negative active material may be a material that reversibly intercalates/deintercalates lithium ions, a lithium metal, a lithium metal alloy, a material being capable of doping and dedoping lithium, a transition metal oxide, or a combination thereof.

The material that reversibly intercalates/deintercalates lithium ions may be a carbon material, such as a generally-used carbon-based negative active material. Examples thereof may include crystalline carbon, amorphous carbon, or a combination thereof.

Examples of the crystalline carbon may include graphite such as amorphous, sheet-shape, flake, spherical shape or fiber-shaped natural graphite or artificial graphite. Examples of the amorphous carbon may include soft carbon (low temperature fired carbon) or hard carbon, a mesophase pitch carbonized product, fired coke, or the like. The lithium metal alloy may be an alloy of lithium and a metal selected from Na, K, Rb, Cs, Fr, Be, Mg, Ca, Sr, Si, Sb, Pb, In, Zn, Ba, Ra, Ge, Al, and Sn. The material being capable of doping and dedoping lithium may be Si, $SiO_x$ ($0<x<2$), a Si—C composite, a Si-Q alloy, Sn, $SnO_2$, a Sn—C composite, a Sn-Q, or the like, and at least one of these may be mixed with $SiO_2$. Specific examples of the element Q may be selected from Mg, Ca, Sr, Ba, Ra, Sc, Y, Ti, Zr, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Tl, Ge, P, As, Sb, Bi, S, Se, Te, Po, or a combination thereof. The transition metal oxide may be vanadium oxide, lithium vanadium oxide, or the like.

The binder and the conductive material used in the negative electrode may be the same as the binder and conductive material of the positive electrode.

The positive electrode and the negative electrode may be manufactured by mixing each active material composition including each active material and a binder, and optionally, a conductive material, in a solvent, and coating the active material composition onto each current collector. The solvent may be N-methylpyrrolidone, or the like, as an example.

The electrolyte solution may include an organic solvent and a lithium salt.

The organic solvent may serve as a medium that transmits ions taking part in the electrochemical reaction of a battery. Examples thereof may be include a carbonate-based solvent, an ester-based solvent, an ether-based solvent, a ketone-based solvent, an alcohol-based solvent, or an aprotic solvent.

Examples of the carbonate-based solvent may include dimethyl carbonate (DMC), diethyl carbonate (DEC), dipropyl carbonate (DPC), methylpropyl carbonate (MPC), ethylpropyl carbonate (EPC), ethylmethyl carbonate (EMC), ethylene carbonate (EC), propylene carbonate (PC), butylene carbonate (BC), or the like.

When the linear carbonate compounds and cyclic carbonate compounds are mixed, an organic solvent having a high dielectric constant and a low viscosity may be provided. The cyclic carbonate compound and the linear carbonate compound may be mixed together in a volume ratio ranging from about 1:1 to about 1:9.

Examples of the ester-based solvent may include methylacetate, ethylacetate, n-propylacetate, dimethylacetate, methylpropionate, ethylpropionate, γ-butyrolactone, decanolide, valerolactone, mevalonolactone, caprolactone, or the like. Examples of the ether-based solvent may include dibutylether, tetraglyme, diglyme, dimethoxyethane, 2-methyltetrahydrofuran, tetrahydrofuran, or the like. Examples of the ketone-based solvent may include cyclohexanone, or the like. Examples of the alcohol-based solvent may include ethanol, isopropyl alcohol, or the like.

The organic solvent may be used singularly or in a mixture of two or more. When the organic solvent is used in a mixture of two or more, the mixture ratio may be controlled in accordance with a desirable cell performance.

The lithium salt may be dissolved in an organic solvent. The lithium salt may supply lithium ions in a battery, basically operate the rechargeable lithium battery, and improve lithium ion transportation between positive and negative electrodes therein.

Examples of the lithium salt may include $LiPF_6$, $LiBF_4$, $LiSbF_6$, $LiAsF_6$, $LiN(SO_3C_2F_5)_2$, $LiN(CF_3SO_2)_2$, $LiC_4F_9SO_3$, $LiClO_4$, $LiAlO_2$, $LiAlCl_4$, $LiN(C_xF_{2x+1}SO_2)(C_yF_{2y+1}SO_2)$, where x and y are natural numbers, LiCl, LiI, $LiB(C_2O_4)_2$, or a combination thereof.

The lithium salt may be used in a concentration ranging from about 0.1 M to about 2.0 M. When the lithium salt is included within the above concentration range, an electrolyte may have excellent performance and lithium ion mobility due to optimal electrolyte conductivity and viscosity.

A rechargeable lithium battery including the separator may be operated at a high voltage, for example, greater than or equal to about 4.35V, or about 4.35V to about 4.55V. Accordingly, a high-capacity rechargeable lithium battery may be realized without degradation of cycle-life characteristics.

The following Examples and Comparative Examples are provided in order to highlight characteristics of one or more embodiments, but it will be understood that the Examples and Comparative Examples are not to be construed as limiting the scope of the embodiments, nor are the Comparative Examples to be construed as being outside the scope of the embodiments. Further, it will be understood that the embodiments are not limited to the particular details described in the Examples and Comparative Examples.

Manufacture of Separator

Example 1

A crosslinked binder solution was obtained by mixing 30 wt % of a siloxane resin including a T-shaped represented by Chemical Formula 1 unit having an alicyclic epoxy group (Flex9H PH30052, Solip Tech Co., Ltd.) and 70 wt % of acetone at room temperature for 1 hour. Herein, the siloxane resin had a weight average molecular weight (Mw) of 20,000 g/mol and 3.3 of polydispersity (PDI) calculated as Mw/number average molecular weight (Mn).

In addition, 7 wt of a polyvinylidene fluoride-based binder having a weight average molecular weight of greater than or equal to 1,000,000 g/mol (KF 9300, KUREHA Inc.), 47 wt % of acetone, and 46 wt % of dimethyl acetamide (DMAC) were mixed with a stirrer at 40° C. for 4 hours, obtaining a non-crosslinked binder solution.

An inorganic dispersion was obtained by grinding $Al_2O_3$ with a bead mill and mixing 25 wt % of the ground $Al_2O_3$ and 75 wt % of acetone at 40° C. for 4 hours.

2.31 wt % of the crosslinked binder solution, 6.59 wt % of the non-crosslinked binder solution, 55.37 wt % of the inorganic dispersion, and 35.70 wt % of acetone were mixed, and 0.03 wt % of sulfonium salt (SI-60L, SanShin Chemical Industry Co., Ltd.) as an initiator was added thereto, preparing a slurry.

The slurry was dip-coated to be respectively 2 μm thick on each side of a 7 μm-thick polyethylene single-layered film (4

μm thick in total on the two sides of the polyethylene single-layered film) and cured at 100° C. for 24 hours, manufacturing a separator.

Example 2

A separator was manufactured according to the same method as Example 1 except for preparing a crosslinked binder solution by mixing 30 wt % of a mixture of the siloxane resin used in Example 1 with a compound represented by Chemical Formula 9 and having a weight average molecular weight of 500 g/mol (Sigma-Aldrich Corporation) in a weight ratio of 9:1 and 70 wt % of acetone at room temperature for 1 hour.

[Chemical Formula 9]

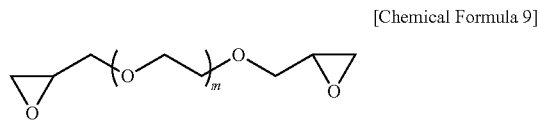

Comparative Example 1

A separator was manufactured according to the same method as Example 1 except for preparing a crosslinked binder solution by mixing a compound represented by Chemical Formula 10 (DBE-U12, Gelest, Inc.) instead of the siloxane resin used in Example 1.

[Chemical Formula 10]

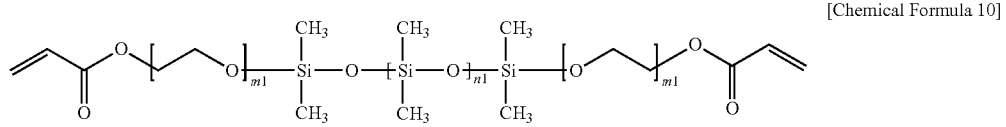

In Chemical Formula 10, $m^1$ is 9 and $n^1$ is 8.

Comparative Example 2

A separator was manufactured according to the same method as Example 1 except for preparing a crosslinked binder solution by mixing a compound represented by Chemical Formula 11 (UMS-182, Gelest, Inc.) instead of the siloxane resin used in Example 1.

[Chemical Formula 11]

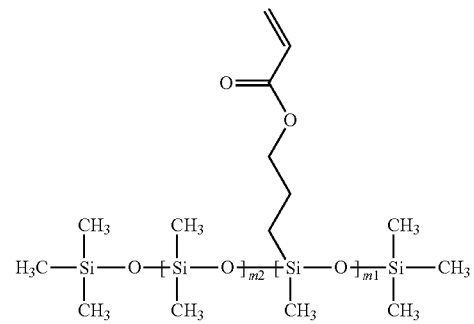

In Chemical Formula 11, $m^2$ is 10 and $n^2$ is 4.

Comparative Example 3

A polyethylene single-layered film having a thickness of 8 μm and ventilation ranging from 90 to 93 sec/100 cc was used as a separator.

Comparative Example 4

A commercially-available separator having a coating layer including polyvinylidene fluoride-hexafluoropropylene (PVdF-HFP) copolymer and $Al_2O_3$ on both sides of a polyethylene substrate (LIELSORT™ P, Teijin Ltd.) was used.

Comparative Example 5

A separator was manufactured according to the same method as Example 1 except for preparing the slurry by mixing 12.8 wt % of the non-crosslinked binder solution, 43.6 wt % of the inorganic dispersion, and 43.6 wt % of acetone.

(Manufacture of Rechargeable Lithium Battery Cell)

$LiCoO_2$, polyvinylidene fluoride, and carbon black in a weight of 96:2:2 were added to an N-methylpyrrolidone (NMP) solvent, preparing a slurry. The slurry was coated onto an aluminum (Al) thin film and dried, manufacturing a positive electrode.

Graphite, a styrene-butadiene rubber, and carboxyl methyl cellulose were added to water in a weight ratio of 97.5:1.5:1, preparing a slurry. The slurry was coated onto a copper foil, dried, and compressed, manufacturing a negative electrode.

An electrolyte solution was prepared by mixing ethylene carbonate (EC), ethylmethyl carbonate (EMC), and diethyl carbonate (DEC) in a volume ratio of 3:5:2 to obtain a mixed solvent and adding 1.15 M $LiPF_6$ thereto.

The positive and negative electrodes, the electrolyte solution, and the separators according to Examples 1 and 2 and Comparative Examples 1 to 5 were used to manufacture rechargeable lithium battery cells.

Evaluation 1: Heat Resistance of Separator

The heat resistance of the separators according to Examples 1 and 2 and Comparative Examples 1 to 5 was evaluated by respectively measuring their thermal shrinkage ratios, thermal ruptures, and their shrinkage ratios after impregnation in the electrolyte solution by the following method. The results are provided in Table 1.

(1) Shrinkage Ratio: A sample was prepared by cutting each separator into a size of 10 cm×10 cm and allowing the prepared separator to stand at 200° C. in a predetermined convection oven for 10 minutes. Shrinkage ratios of each sample with respect to the MD (machine direction) and TD (traverse direction) were measured. The shrinkage ratios were calculated according to the following equation 1.

Shrinkage ratio (%)=[(L0−L1)/L0]×100  [Equation 1]

In Equation 1, L0 indicates an initial length of the separator and L1 indicates a length of the separator after being allowed to stand at 200° C. for 10 minutes.

(2) Thermal Rupture: Each sample was prepared by cutting the separators into a size of 12 cm×12 cm, fixing each separator in a 10 cm×10 cm SUS (TEFLON coated) frame 5 cm above the ground and allowing each fixed separator to stand at a temperature of 200° C. and 230° C. in a convection oven for 10 minutes. An evaluation of Pass or Fail of each sample was determined by its shape change in a MD or TD direction.

Pass: No crack or rupture in MD and TD directions
Fail: Crack or rupture in MD or TD directions The thickness change rate of a coating layer was calculated according to the following equation 2 by allowing a 10 cm×10 cm separator to stand in a convection oven set at 200° C. for 10 minutes.

$$\text{Thickness change rate (\%)} = [(T0-T1)/T0] \times 100 \quad \text{[Equation 2]}$$

In Equation 2, T0 indicates an initial thickness of a separator and T1 indicates a thickness of a separator after being allowed to stand at 200° C. for 10 minutes.

(3) Shrinkage ratio (%) after impregnation in an electrolyte solution: each sample was prepared by cutting the separators into a size of 5 cm×10 cm. Subsequently, a polyethyleneterephthalate (PET) film having a thickness of 5 mm to 10 mm was cut into a size of 7 cm×10 cm, and then, both ends of the separator were fixed onto the PET film. This obtained sample was put in a 10 ml vial and then allowed to stand at 150° C. for 30 minutes while the electrolyte solution was poured thereinto until the sample was submerged. The shrinkage ratio of each sample in the MD (machine direction) and TD (traverse direction) was measured. The shrinkage ratio was calculated according to the following equation 1. The electrolyte solution was prepared by dissolving 1 M $LiPF_6$ in a propylene carbonate (PC) solvent.

$$\text{Shrinkage ratio (\%)} = [(L0-L1)/L0] \times 100 \quad \text{[Equation 1]}$$

In Equation 1, L0 indicates an initial length of the separator and L1 indicates a length of the separator after being allowed to stand at 150° C. for 30 minutes.

Referring to Table 1, Examples 1 and 2 using a crosslinked binder formed from a siloxane resin including a T-shaped unit represented by Chemical Formula 1 and a curable reactive group showed a low thermal shrinkage ratio, excellent thermal rupture characteristics, and excellent heat resistance due to excellent impregnation in the electrolyte solution compared with Comparative Examples 1 and 2 using a siloxane resin including no T-shaped unit represented by Chemical Formula 1 and Comparative Examples 3 to 5 using no crosslinked binder. Accordingly, the separator according to embodiments may realize a stable rechargeable lithium battery cell during battery explosion and overheating.

Evaluation 2: Contact Angle of Separator and Binder Film

A contact angle of water with respect to each of the separators according to Examples 1 and 2 and Comparative Examples 1, 2, and 5 was measured in the following method, and the results are provided in Table 2.

The separators were respectively fixed on a glass plate and placed in parallel on a sample holder of a contact angle measuring instrument (DSA100S, KRUSS Optronic GmbH). 2 μL of water dropped on the surface of the separators, and the contact angle of the water with respect to each of the separators was read. The reading was repeated more than three times, and the measurements were averaged.

In addition, a binder formed during manufacture of the separators according to Examples 1 and 2 and Comparative Examples 1, 2, and 5 was formed into a film, and a contact angle of water and the electrolyte solution with respect to the binder film was measured in the same method as above, and the results are provided in Table 2. Herein, the electrolyte solution was prepared by dissolving 1 M $LiPF_6$ in a propylene carbonate (PC) solvent. The binder film was formed by dissolving 30 wt % of the binder in acetone, adding 5 parts by weight of an initiator, SI-60, based on 100 parts by weight of the binder thereto, and pouring the mixture to an aluminum dish, and curing it at 85° C. for 24 hours.

TABLE 1

| | Shrinkage ratio (%) | | Thermal rupture | | | Shrinkage ratio after impregnation of electrolyte solution (%) | |
|---|---|---|---|---|---|---|---|
| | MD | TD | 200° C., 10 min | 230° C., 10 min | Thickness change rate (%) | MD | TD |
| Ex. 1 | 5 | 4 | Pass | Pass | 25 | 0 | 4 |
| Ex. 2 | 2 | 4 | Pass | Pass | 25 | 0 | 1 |
| Comp. Ex. 1 | greater than 10 | greater than 10 | | | * | | |
| Comp. Ex. 2 | greater than 10 | greater than 10 | | | * | | |
| Comp. Ex. 3 | greater than 70 | greater than 70 | Fail | Fail | Unmeasurable | 10 | 70 |
| Comp. Ex. 4 | greater than 50 | greater than 50 | Fail | Fail | Unmeasurable | 5 | 50 |
| Comp. Ex. 5 | greater than 20 | greater than 20 | Fail | Fail | Unmeasurable | 5 | 50 |

In Table 1, * indicates immeasurability due to a coating defect according to stability deterioration of a composition.

TABLE 2

| | Contact angle of water with respect to separator (°) | Contact angle of water with respect to binder film (°) | Contact angle of electrolyte solution with respect to binder film (°) |
|---|---|---|---|
| Ex. 1 | 127.7 | 62.6 | 28.8 |
| Ex. 2 | 113.9 | 63.77 | Unmeasurable |
| Comp. Ex. 1 | 121.5 | * | * |
| Comp. Ex. 2 | 133.4 | * | * |
| Comp. Ex. 5 | 119 | 95 | 32 |

In Table 2, * indicates immeasurability due to impossibility of a film formation. Specifically, a film was not formed due to deterioration of curing properties in Comparative Examples 1 and 2. In addition, the binder film of Example 2 absorbed the electrolyte solution too fast to measure a contact angle.

Referring to Table 2, Examples 1 and 2 using a crosslinked binder formed of a siloxane resin including a T-shaped unit represented by Chemical Formula 1 and having a curable reactive group showed high hydrophilicity and affinity for the electrolyte solution compared with Comparative Example 5 using no crosslinked binder but only a PVDF-based binder.

Evaluation 3: Oxidation Resistance of Separator

Figure 2:
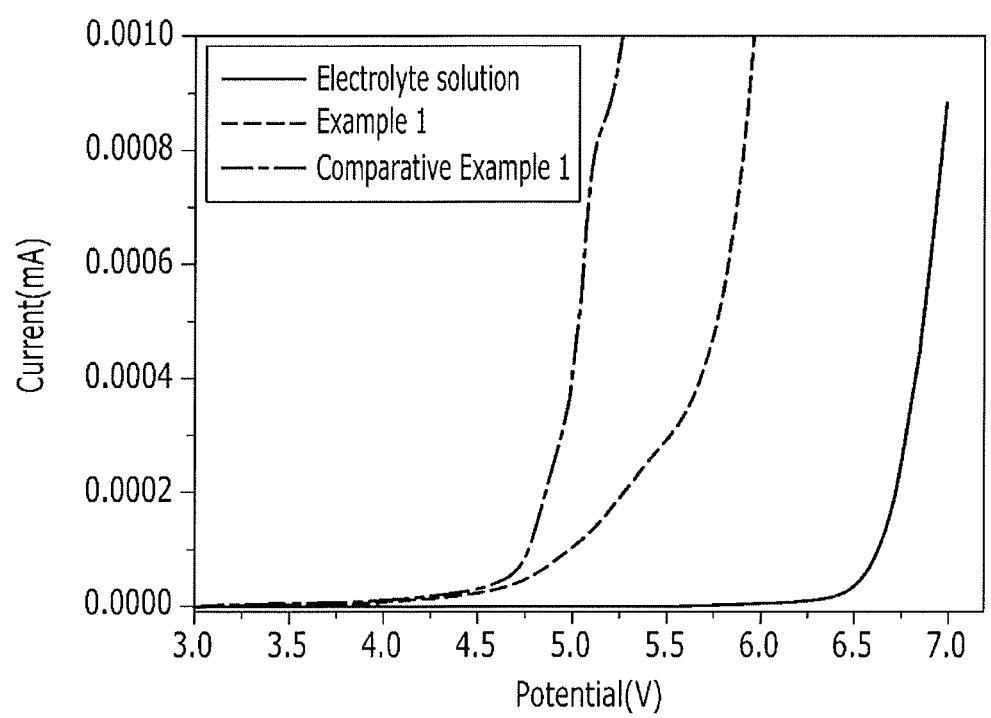
FIG. 2 illustrates a graph showing linear sweep voltammetry (LSV) of the crosslinked binder used for the separator for a rechargeable lithium battery according to Example 1 and Comparative Example 1.

The crosslinked binder used during manufacture of each separator was analyzed by linear sweep voltammetry (LSV) in order to evaluate the oxidation resistance of the separators according to Example 1 and Comparative Example 1, and the results are provided in FIG. 2.

FIG. 2 illustrates a graph showing the linear sweep voltammetry (LSV) analysis results with respect to the crosslinked binder used during manufacture of the separators according to Example 1 and Comparative Example 1. The electrolyte solution referred to in FIG. 2 had composition obtained by mixing ethylene carbonate (EC), ethylmethyl carbonate (EMC), and dimethyl carbonate (DMC) in a volume ratio of 2:4:4 and dissolving 1.15 M $LiPF_6$ in the mixed solvent.

The LSV measurement was performed by using a three electrode electrochemical cell using a Pt electrode as a working electrode and a Li metal as a reference electrode and a counter electrode. Herein, a scan was performed from 3 V to 7 V at a speed of 1.0 mV/sec.

Referring to FIG. 2, Example 1 and Comparative Example 1 showed each oxidation potential of 5.13 V and 4.75 V. Example 1 using a crosslinked binder formed from a siloxane resin including a T-shaped unit represented by Chemical Formula 1 showed excellent oxidation resistance compared with Comparative Example 1 using a crosslinked binder formed from a siloxane resin including a D-shaped unit represented by Chemical Formula 2.

Evaluation 4: Mechanical Strength of Separator

The puncture strength of the separators according to Examples 1 and 2 and Comparative Examples 1 to 3 was measured in the following method, and the results are provided in Table 3.

The puncture strength was measured by cutting each separator into a size of 5 cm×5 cm to obtain a sample, fixing the sample on an equipment holder, and using a puncture strength test machine equipped with a Φ1 pin (K5, Kato Tech Co., Ltd.).

TABLE 3

| | Puncture strength (gf) |
|---|---|
| Ex. 1 | 376 |
| Ex. 2 | 379 |
| Comp. Ex. 1 | * |

TABLE 3-continued

| | Puncture strength (gf) |
|---|---|
| Comp. Ex. 2 | * |
| Comp. Ex. 3 | 358 |

In Table 3, * indicates immeasurability due to unstable composition and a coating defect.

Referring to Table 3, Examples 1 and 2 using a crosslinked binder formed of a siloxane resin including a T-shaped unit represented by Chemical Formula 1 and having a curable reactive group showed high mechanical strength compared with Comparative Example 3 forming no coating layer. Accordingly, the separators according to embodiments may secure a rechargeable lithium battery having excellent safety.

Evaluation 5: Impedance of Separator

Impedance of the rechargeable lithium battery cells according to Example 1 and Comparative Examples 1, 2, and 5 was evaluated, and the results are provided in Table 4.

After aging the cells for 24 hours, performing a formation process at 0.2 C (1 C=2400 mAh), and cutting off in a range of 4.35 V to 3.0 V, the cells were charged at 0.5 C and discharged at 0.5 C as one cycle. The cells were charged at 1 C and discharged at 1 C after cutting-off in a range of 4.35 V to 3.0 V during the rest of repetitive 499 cycles.

TABLE 4

| | Impedance (Ω) |
|---|---|
| Example 1 | 2.73 |
| Comparative Example 1 | * |
| Comparative Example 2 | * |
| Comparative Example 5 | 2.85 |

In Table 4, * indicates immeasurability due to an unstable composition and a coating defect.

Referring to Table 4, Example 1 using the crosslinked binder formed of a siloxane resin including a T-shaped unit represented by Chemical Formula 1 and having a curable reactive group showed equivalent resistance compared with Comparative Example 5 using no crosslinked binder but only a PVdF-based binder.

By way of summation and review, a rechargeable lithium battery includes a positive electrode, a negative electrode, and a separator interposed between the positive and negative electrodes. The separator plays a role of electrically insulating the positive and negative electrodes. The separator may include micropores through which lithium ions move.

As batteries become lighter and smaller while providing a power source having high power/large capacity for the electric vehicle, it is desirable that the separator secure excellent stability with respect to exothermicity of the battery. In this regard, a general separator formed by coating a binder resin and a ceramic particle on a porous substrate may not be able to secure sufficient stability due to shrinkage during overheating of the battery Embodiments may provide a separator for a rechargeable lithium battery that has improved wettability for an electrolyte solution as well as improved heat resistance and oxidation resistance. A rechargeable lithium battery may have improved cell performance such as cycle-life characteristics and safety due to the separator.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A separator for a rechargeable lithium battery, the separator comprising:
   a substrate; and
   a heat-resistant porous layer on at least one side of the substrate, the heat-resistant porous layer including a crosslinked binder and an ether-based compound,
   wherein:
   the crosslinked binder has a cross-linked structure of a crosslinkable compound including a siloxane compound, and
   the siloxane compound includes a siloxane resin including a unit represented by Chemical Formula 1:

$R^1SiO_{3/2}$  [Chemical Formula 1]

wherein, in Chemical Formula 1, $R^1$ is a C6 to C20 cycloalkyl group including a fused epoxy structure, a C6 to C20 cycloalkenyl group including a fused epoxy structure, or a C3 to C20 cycloalkynyl group including a fused epoxy structure, and
   the ether-based compound is represented by Chemical Formula 9:

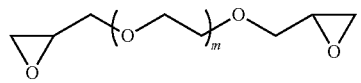
   [Chemical Formula 9]

wherein m is an integer.

2. The separator for a rechargeable lithium battery as claimed in claim 1, wherein the siloxane resin further includes a unit represented by Chemical Formula 2, a unit represented by Chemical Formula 3, or a combination thereof:

$(R^2)(R^3)SiO_{2/2}$  [Chemical Formula 2]

$(R^4)(R^5)(R^6)SiO_{1/2}$  [Chemical Formula 3]

wherein, in Chemical Formulae 2 and 3, $R^2$, $R^3$, $R^4$, $R^5$, and $R^6$ are independently a curable reactive group, an organic group having a curable reactive group, a substituted or unsubstituted C1 to C20 alkyl group, a substituted or unsubstituted C2 to C20 alkenyl group, a substituted or unsubstituted C2 to C20 alkynyl group, or a substituted or unsubstituted C6 to C20 aryl group.

3. The separator for a rechargeable lithium battery as claimed in claim 2, wherein the siloxane resin includes about 50 mol % to about 99 mol % of the unit represented by Chemical Formula 1.

4. The separator for a rechargeable lithium battery as claimed in claim 1, wherein the siloxane resin has a weight average molecular weight of about 600 g/mol to about 40,000 g/mol.

5. The separator for a rechargeable lithium battery as claimed in claim 1, wherein the siloxane compound further includes a siloxane resin including a unit represented by Chemical Formula 2, a siloxane resin including a unit represented by Chemical Formula 3, or a combination thereof:

$(R^2)(R^3)SiO_{2/2}$  [Chemical Formula 2]

$(R^4)(R^5)(R^6)SiO_{1/2}$  [Chemical Formula 3]

wherein, in Chemical Formulae 2 and 3, $R^2$, $R^3$, $R^4$, $R^5$, and $R^6$ are independently a curable reactive group, an organic group having a curable reactive group, a substituted or unsubstituted C1 to C20 alkyl group, a substituted or unsubstituted C2 to C20 alkenyl group, a substituted or unsubstituted C2 to C20 alkynyl group, or a substituted or unsubstituted C6 to C20 aryl group.

6. The separator for a rechargeable lithium battery as claimed in claim 5, wherein the siloxane resin that includes the unit represented by Chemical Formula 1 is present in the siloxane compound in an amount of about 50 mol % to about 99 mol % based on the total amount of the siloxane compound.

7. The separator for a rechargeable lithium battery as claimed in claim 1, wherein the siloxane compound is included in the crosslinkable compound in an amount of about 50 wt % to about 99 wt % based on the total amount of the siloxane compound and the ether-based compound.

8. The separator for a rechargeable lithium battery as claimed in claim 1, wherein the heat-resistant porous layer further includes a filler, the filler including an inorganic particle, an organic particle, or a combination thereof.

9. The separator for a rechargeable lithium battery as claimed in claim 8, wherein:
   when the filler includes the inorganic particle, the inorganic particle includes $Al_2O_3$, $SiO_2$, $B_2O_3$, $Ga_2O_3$, $TiO_2$, $SnO_2$, or a combination thereof, and
   when the filler includes the organic particle, the organic particle includes an acryl-based compound, an imide-based compound, an amide-based compound, or a combination thereof.

10. The separator for a rechargeable lithium battery as claimed in claim 8, wherein the filler is included in the heat resistant porous layer in an amount of about 50 wt % to about 95 wt % based on the total amount of the crosslinked binder and the filler.

11. The separator for a rechargeable lithium battery as claimed in claim 8, wherein the heat-resistant porous layer further includes a non-crosslinked binder.

12. The separator for a rechargeable lithium battery as claimed in claim 11, wherein the non-crosslinked binder includes a vinylidene fluoride-based polymer, polymethylmethacrylate, polyacrylonitrile, polyvinylpyrrolidone, polyvinylacetate, a polyethylene-vinylacetate copolymer, polyethyleneoxide, cellulose acetate, cellulose acetate butyrate, cellulose acetate propionate, cyanoethyl pullulan, cyanoethylpolyvinyl alcohol, cyanoethyl cellulose, cyanoethylsucrose, pullulan, carboxymethyl cellulose, an acrylonitrile-styrene-butadiene copolymer, or a combination thereof.

13. The separator for a rechargeable lithium battery as claimed in claim 11, wherein the filler is included in the heat-resistant porous layer in an amount of about 50 wt % to about 99 wt % based on the total amount of the crosslinked binder, the filler, and the non-crosslinked binder.

14. The separator for a rechargeable lithium battery as claimed in claim 1, wherein a shrinkage ratio in a machine direction (MD) of the separator and a shrinkage ratio in a transverse direction (TD) with respect to the machine direction of the separator are each less than or equal to about 5% according to Equation 1:

$$\text{Shrinkage ratio (\%)} = [(L0 - L1)/L0] \times 100 \quad \text{[Equation 1]}$$

wherein, in Equation 1, L0 indicates an initial length of a separator and L1 indicates a length of a separator after being allowed to stand at 200° C. and for 10 minutes.

15. A rechargeable lithium battery comprising the separator as claimed in claim 1.

16. The rechargeable lithium battery as claimed in claim 15, wherein the rechargeable lithium battery is operable at a voltage of about 4.35V to about 4.55V.

17. The separator for a rechargeable lithium battery as claimed in claim 1,
wherein the ether-based compound of Chemical Formula 9 has a weight average molecular weight of 500 g/mol.

* * * * *